(No Model.)
J. E. GRIST.
VALVE FOR GAS OR AIR COMPRESSORS.
No. 507,901. Patented Oct. 31, 1893.
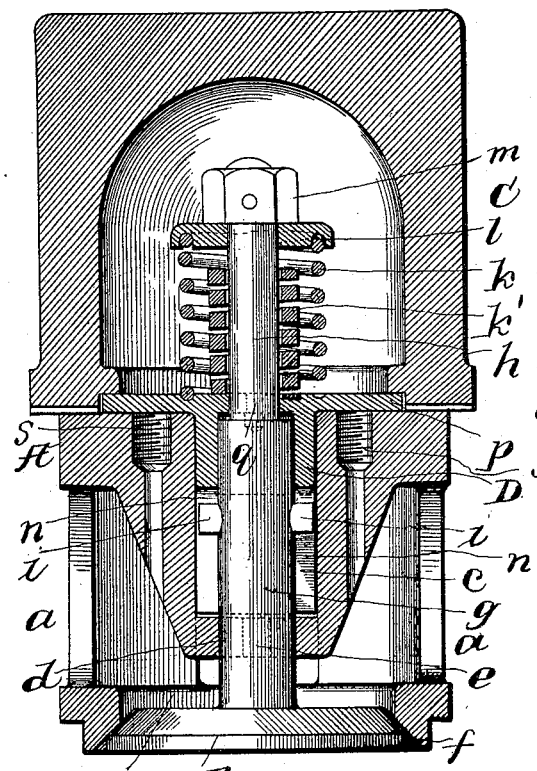
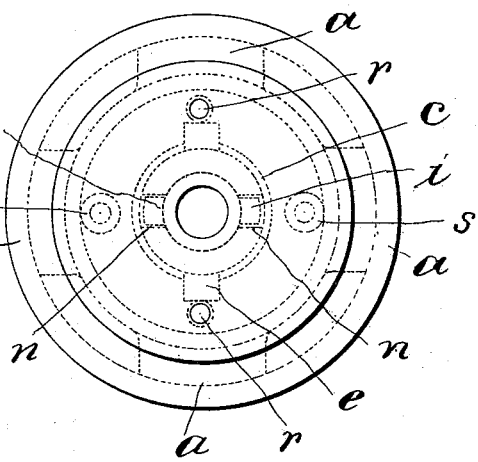
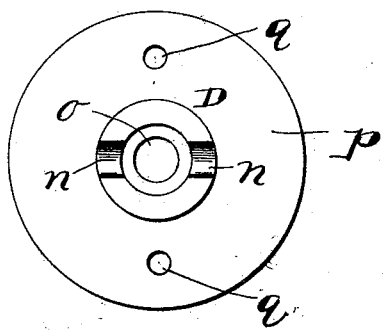
Witnesses
G. A. Faubenschmidt.
H. B. Reinohl.
Inventor
James E. Grist
By D. C. Reinohl
Attorney

UNITED STATES PATENT OFFICE.

JAMES E. GRIST, OF PHILADELPHIA, PENNSYLVANIA, ASSIGNOR TO THE PENNSYLVANIA IRON WORKS COMPANY, OF SAME PLACE.

VALVE FOR GAS OR AIR COMPRESSORS.

SPECIFICATION forming part of Letters Patent No. 507,901, dated October 31, 1893.

Application filed March 17, 1893. Serial No. 466,517. (No model.)

*To all whom it may concern:*

Be it known that I, JAMES E. GRIST, a citizen of the United States, residing at Philadelphia, in the county of Philadelphia and State of Pennsylvania, have invented certain new and useful Improvements in Valves for Gas or Air Compressors; and I do hereby declare the following to be a full, clear, and exact description of the invention, such as will enable others skilled in the art to which it appertains to make and use the same.

My present invention relates to gas or air compressors and has for its object certain improvements in induction valves to prevent their falling into the cylinder in the event of the valve stem breaking or the nut working off the valve stem.

The invention will be fully disclosed in the following specification and claims.

In the accompanying drawings which form part of this specification, Figure 1 represents a vertical section of my improved valve; Fig. 2 a top plan view of the same; Fig. 3 a side elevation of the slotted and flanged sleeve detached and Fig. 4 an inverted plan view of the same.

Reference being had to the drawings and the letters thereon, A indicates the valve-cage provided with ingress ports $a\ a\ a\ a$ in the circumference of the cage and the port $b$ in the lower end, a cylindrical chamber $c$ in its center having a cylindrical opening $d$ of less diameter than the chamber in its lower end; and in said opening $d$ are slots $e\ e$ on opposite sides.

B indicates the valve which rests upon the annular seat $f$ of the cage A, and the valve is provided with a stem of variable diameters; the lower part $g$ being the larger and corresponds in diameter with the diameter of the opening $d$ in the bottom of the chamber $c$, and the upper part $h$ the smaller and extends beyond the cage into the bonnet C. On the large part of the valve stem are laterally projecting lugs $i\ i$ whose outer diameter is about equal to or slightly less than the diameter of the chamber $c$ to move freely therein. Around the upper part of the valve stem are the helically coiled springs $k$ and $k'$, and the disk $l$, common to this kind of valves, and on the end of the stem is the nut $m$ for regulating the tension of the spring $k$ to close the valve B automatically.

D indicates the flanged-sleeve, the outer diameter of the sleeve being equal to the diameter of the chamber $c$ to fit closely therein and the inner diameter of the sleeve being the same as the diameter of the large part $g$ of the valve stem. The sleeve is provided with vertical slots $n$ diametrically opposite each other and of a width equal to or slightly in excess of the thickness of the lugs $i\ i$ on the valve stem. The sleeve is also provided with an opening $o$ in its upper end which opening is equal to the diameter of the part $h$ of the valve stem and through which opening the valve stem projects. The upper part of the flanged-sleeve forms a seat for the springs $k, k'$, and in the flange $p$ are apertures $q\ q$ which engage with studs or pins $r\ r$ projecting from the upper end of the valve-cage to prevent the sleeve revolving on its axis in the chamber $c$ of the cage.

In assembling the valve and its cage, the valve-stem is passed up from the under side of the cage, the stem being turned to permit the lugs $i\ i$ to pass through the slots $e\ e$. The valve-stem is then turned axially to bring the lugs at right angles to the slots $e\ e$, when the sleeve D is inserted into the chamber $c$ of the cage with the slots $n\ n$ of the sleeve over the lugs $i\ i$ on the valve stem and pressed down until the flange $p$ rests upon the upper end of the valve-cage and the apertures $q\ q$ have engaged the studs $r\ r$. The springs $k, k'$ and the disk $l$ are then placed in position around the upper end of the valve-stem and the nut $m$ applied, when the valve is ready to be inserted in the head of the compressing cylinder.

The screw-threaded apertures $s\ s$ are designed to receive eye-bolts (not shown) to facilitate the handling and setting of the valve.

It will be observed that the springs $k\ k'$ resting upon the upper surface of the sleeve D serve to keep the sleeve down to its place in the chamber $c$ of the valve-cage.

Having thus fully described my invention, what I claim is—

1. The combination of a valve having a stem provided with lateral projections, a cage having a chamber provided with an opening in the bottom thereof and slots on opposite sides of said opening, and a sleeve provided with means to prevent axial rotation of the valve and its stem.

2. The combination of a valve having a stem provided with lateral projections, a cage having a chamber provided with an opening in the bottom thereof and slots on opposite sides of said opening, a sleeve having vertical slots engaging the projections on the valve-stem and means for preventing axial rotation of the sleeve, the valve and stem.

3. The combination of a valve having a stem provided with lateral projections, a cage having a chamber provided with an opening in the bottom thereof and slots on opposite sides of said opening, a flanged-sleeve having vertical slots in the sleeve to engage the projections on the valve stem; and apertures in the flange to engage studs in the upper end of the valve-cage.

4. The combination of a valve having a stem of variable diameters, lateral projections upon said stem, a valve-cage having a chamber of greater internal diameter than the largest portion of the valve-stem and provided with an opening in its bottom of the diameter of the valve-stem and slots on opposite sides of said opening, a flanged sleeve having vertical slots to engage the projections on the valve-stem, means for preventing axial rotation of said sleeve, a spring surrounding the small portion of the valve-stem and resting upon the sleeve, a disk and a nut on the valve-stem.

In testimony whereof I affix my signature in presence of two witnesses.

JAMES E. GRIST.

Witnesses:
C. H. COCHRAN,
JOS. M. STURGES.